United States Patent
Kowald

(10) Patent No.: US 7,606,397 B2
(45) Date of Patent: Oct. 20, 2009

(54) VISUAL LANGUAGE CLASSIFICATION SYSTEM

(75) Inventor: Julie Rae Kowald, Newport (AU)

(73) Assignee: Canon Kabushiki Kaisha, Tokyo (JP)

( * ) Notice: Subject to any disclaimer, the term of this patent is extended or adjusted under 35 U.S.C. 154(b) by 1351 days.

(21) Appl. No.: 09/730,573

(22) Filed: Dec. 7, 2000

(65) Prior Publication Data

US 2003/0002715 A1    Jan. 2, 2003

(30) Foreign Application Priority Data

Dec. 14, 1999    (AU) .................................. PQ4640

(51) Int. Cl.
G06K 9/00    (2006.01)
(52) U.S. Cl. .................... 382/118; 382/305; 715/719; 345/619
(58) Field of Classification Search ................ 382/115, 382/117, 118, 199, 209, 224, 263, 264, 282, 382/309; 348/77, 169
See application file for complete search history.

(56) References Cited

U.S. PATENT DOCUMENTS

| | | | | |
|---|---|---|---|---|
| 5,608,859 A * | 3/1997 | Taguchi | ...................... | 715/204 |
| 5,642,431 A | 6/1997 | Poggio et al. | ............... | 382/118 |
| 5,850,470 A * | 12/1998 | Kung et al. | .................. | 382/157 |
| 5,969,716 A * | 10/1999 | Davis et al. | .................. | 715/726 |
| 6,111,580 A * | 8/2000 | Kazama et al. | ............. | 345/863 |
| 6,118,887 A * | 9/2000 | Cosatto et al. | .............. | 382/103 |
| 6,173,069 B1 | 1/2001 | Daly et al. | .................. | 382/118 |
| 6,324,545 B1 * | 11/2001 | Morag | ........................ | 707/202 |
| 6,445,810 B2 * | 9/2002 | Darrell et al. | ............... | 382/115 |
| 6,473,198 B1 | 10/2002 | Matama | ...................... | 358/1.9 |
| 6,535,639 B1 * | 3/2003 | Uchihachi et al. | ........... | 382/225 |
| 6,549,643 B1 * | 4/2003 | Toklu et al. | ................. | 382/107 |
| 6,593,956 B1 * | 7/2003 | Potts et al. | ............... | 348/14.09 |
| 6,671,405 B1 * | 12/2003 | Savakis et al. | .............. | 382/203 |
| 6,686,918 B1 * | 2/2004 | Cajolet et al. | ................ | 345/473 |
| 6,738,494 B1 * | 5/2004 | Savakis et al. | .............. | 382/100 |
| 6,748,097 B1 * | 6/2004 | Gindele et al. | .............. | 382/112 |
| 6,754,389 B1 * | 6/2004 | Dimitrova et al. | ........... | 382/224 |
| 7,554,542 B1 * | 6/2009 | Ferraro et al. | ............... | 345/427 |
| 2002/0089516 A1* | 7/2002 | Sobol | .......................... | 345/620 |
| 2002/0120925 A1* | 8/2002 | Logan | ........................... | 725/9 |
| 2003/0002715 A1* | 1/2003 | Kowald | ...................... | 382/118 |
| 2003/0068084 A1* | 4/2003 | Kinjo et al. | .................. | 382/164 |
| 2003/0095789 A1* | 5/2003 | Wakimoto et al. | ............ | 386/52 |
| 2003/0161506 A1* | 8/2003 | Velazquez et al. | ........... | 382/118 |
| 2004/0052505 A1* | 3/2004 | Ahmad et al. | ................. | 386/69 |

(Continued)

OTHER PUBLICATIONS

Sethi et al, "A statistical approach to scene change detection," IS&T SPIE, Feb. 1995, pp. 1-10.*

(Continued)

*Primary Examiner*—Matthew C. Bella
*Assistant Examiner*—Sath V. Perungavoor
(74) *Attorney, Agent, or Firm*—Fitzpatrick, Cella, Harper & Scinto

(57) ABSTRACT

Disclosed are a method and system for automated classification of a digital image. The method analyzes the image for the presence of a human face. A determination is then made regarding the size of the located face compared to the size of the image to classify the image based on the relative size of the face. Alternatively, the position of the face within the image can be used to determine the classification. With a classified image, particularly forming part of a sequence of classified images, editing of the sequence may be performed dependent upon the classification to achieve a desired aesthetic effect. The editing may be performed with the aid of an editing template.

9 Claims, 6 Drawing Sheets

U.S. PATENT DOCUMENTS

2004/0130567 A1* 7/2004 Ekin et al. .................. 345/723
2004/0207743 A1* 10/2004 Nozaki et al. .......... 348/333.12
2007/0058869 A1* 3/2007 Matsuzaka et al. .......... 382/190

OTHER PUBLICATIONS

Chandler, "The 'Grammar' of Television and Film", UWA 1994, pp. 1-2.*

Murphy, "Digital Document Metadata in Organizations: Roles, Analytical Approaches, and Future Research Directions," IEEE, 1998, pp. 267-276.*

Anni Coden, Norman Haas, Robert Mack, "Multi-Search of Video Segments Indexed by Time-Aligned Annotations of Video Content", IBM Research Report, RC21444 (96156) Nov. 18, 1998.*

Gang Wei, et al., "*Face Detection for Image Annotation*," Pattern Recognition Letters 20 (1999), pp. 1313-1321.

* cited by examiner

FRAME 4
250% zoom

FRAME 3
200% zoom

FRAME 2
150% zoom

Frame 1

Camera pan path with zoom points

VISUAL LANGUAGE CLASSIFICATION SYSTEM

TECHNICAL FIELD OF THE INVENTION

The present invention relates generally to the classification of image data and, in particular, to a form of automated classification that permits an editor to automatically generate emotive presentations of the image data.

BACKGROUND

The editing of video of sequences of images (e.g., films, video, slide shows), to achieve a desired reaction from an audience traditionally requires input from a human editor who employs techniques other than the mere sequencing of images over a time line. To achieve an understanding by the audience of the intended message or purpose of the production, the editor must draw upon human interpretation methods which are then applied to moving or still images that form the sequence.

Film makers use many techniques to obtain a desired meaning from images, such techniques including the identification and application of different shot types, both moving and still, the use of different camera angles, different lens types and also film effects. The process of obtaining meaning from the images that make up the final production commences with a story or message that is then translated into a storyboard that is used by the film crew and film director as a template. Once the film is captured, the editor is then given the resulting images and a shot list for sequencing. It is at an early stage of production, when the screen writer translates the written story or script to a storyboard, that written language becomes visual language. This occurs due to the method by which the audience is told the story and must interpret the message. The visual nature of a moving image generally only has dialogue relevant to the character's experience and, in most cases, is absent of explicit narrative relative to the story being told and the emotional state of the characters within the story. The screen writers must therefore generate this additional information using the visual language obtained from different shot types.

Examples of different shot types or images are seen in FIGS. 1A to 1G. FIG. 1A is representative of an extreme long shot (ELS) which is useful for establishing the characters in their environment, and also orientating the audience as to the particular location. FIG. 1B is representative of a long shot (LS) which is also useful for establishing the characters in their environment and orientating the audience as to the location. In some instances, an ELS is considered more dramatic than the LS. FIG. 1C is representative of a medium long shot (MLS) in which the characters are closer to the viewer and indicates, in a transition from a long shot, subjects of importance to the story. Typically for human subjects, an MLS views those subjects from the knees upwards. FIG. 1D is indicative of a medium shot (MS) in which human characters are generally shown from the waist upwards, and the shot assists the viewer interpreting the characters reactions to their environment and any particular dialogue taking place. FIG. 1E is indicative of a medium closeup (MCU) in which human characters are generally shown from the chest upwards. The MCU is useful for dialogue and communication interpretation including the emotion of the speaking characters. FIG. 1F is indicative of a closeup (CU) which for human characters frames the forehead and shoulders within the shot, and is useful for clear understanding of the emotions associated with any particular dialogue. The closeup is used to consciously place the audience in the position of the character being imaged to achieve a greater dramatic effect. FIG. 1G is representative of an extreme closeup (ECU) formed by a very tight shot of a portion of the face and demonstrates beyond the dialogue the full dramatic effect of intended emotion. An ECU can be jarring or threatening to the audience in some cases and is often used in many thriller or horror movies. It will further be apparent from the sequence of images in FIGS. 1A to 1G that different shots clearly can display different meaning. For example, neither of FIGS. 1F and 1G indicate that the subject is seen flying a kite, nor do FIG. 1D or 1E place the kite flying subject on a farm indicated by the cow seen in FIGS. 1A to 1C. Further, it is not apparent from FIG. 1A that the subject is smiling or indeed that the subject's eyes are open.

A photograph or moving image of a person incorporating a full body shot will be interpreted by the viewer as having a different meaning to a shot of exactly the same person, where the image consists of only a closeup of the face of the subject. A full-length body shot is typically interpreted by a viewer as informative and is useful to determine the sociological factors of the subject and the relationship of the subject to the particular environment.

An example of this is illustrated in FIGS. 2A to 2C which show the same subject matter presented with three different shot types. FIG. 2A is a wide shot of the subject within the landscape and is informative as to the location, subject and activity taken close within the scene. FIG. 2B is a mid-shot of the subject with some of the surrounding landscape, and changes the emphasis from the location and activity to the character of the subject. FIG. 2C provides a closeup of the subject and draws the audience to focus upon the subject.

Panning is a technique used by screen writers to help the audience participate in the absorption of information within a scene. The technique is commonly used with open landscapes or when establishing shots are used in movie productions. A straight shot, obtained when the camera does not move, contrasts the effectiveness of a pan. With a straight shot, the viewer is forced to move their eyes around the scene, searching for information, as opposed to how the pan feeds information to the viewer thus not requiring the viewer to seek out a particular message. The movement of the camera within a pan directs the audience as to those elements within a scene that should be observed and, when used correctly, is intended to mimic the human method of information interpretation and absorption. FIG. 3A is an example of a still shot including a number of image elements (e.g., the sun, the house, the cow, the person and the kite) which the audience may scan for information. In film, a still shot is typically used as an establishing shot so as to orientate the audience with the location and the relationship to the story. The screen writer relies upon this type of shot to make sense of any following scenes. FIG. 3B demonstrates an example of a panning technique combined with a zoom, spread amongst four consecutive frames.

Further, differing camera angles, as opposed to direct, straight shots, are often used to generate meaning from the subject, such meaning not otherwise being available due to dialogue alone. For example, newspaper and television journalists often use altered camera angles to solicit propaganda about preferred election candidates. For example, interviews recorded from a low angle present the subject as superior to the audience, whereas the presentation of the same subject may be altered if taken from a high angle to give an inferior interpretation. The same technique is commonly used in movie making to dramatically increase the effect of an antagonist and his victim. When the victim is shot from a high angle, he or she not only appears as weak and vulnerable, but the audience emphathizes with the character and also experiences the character's fear.

FIG. 4A is indicative of an eye level shot which is a standard shot contrasting with angles used in other shots and seen in FIGS. 4B to 4E. FIG. 4B shows a high angle shot and is used to place the subject in an inferior position. FIG. 4C is indicative of a low angle shot where the camera angle is held low with the subject projecting them as superior. FIG. 4D is indicative of an oblique angle shot where the camera is held off-center influencing the audience to interpret the subject as out of the ordinary, or as unbalanced in character. FIG. 4E is representative of a Dutch angle shot which is often used to generate a hurried, "no time to waste" or bizarre effect of the subject. The audience is conveyed a message that something has gone astray in either a positive or negative fashion.

There are many other types of images or shots in addition to those discussed above that can give insight to the particular story being presented. Tracking shots follow the subject allowing the audience the experience of being part of the action. Panning gives meaning and designates importance to subjects within a scene as well as providing a panoramic view of the scene. A "swish" pan is similar, however is used more as a transition within a scene, quickly sweeping from one subject to another, thus generating a blurred effect. Tilt shots consist of moving the camera from one point up or down, thus mimicking the way in which humans evaluate a person or vertical object absorbing the information presented thereby. A hand-held shot portrays to the audience that the filming is taking place immediately, and if often used to best effect when associated with shots taken when the camera is supported (e.g., using a tripod or boom).

To understand the impact visual language has on presenting images in a more meaningful way, it is appropriate to compare the results of contemporary motion pictures with earlier attempts of film making. Early examples of motion pictures consisted of full shots of the characters from the feet upwards reflecting the transition from stage acting. For example, the Charlie Chaplin era of film making and story telling contrasts sharply with later dramatic, emotion filled motion pictures. Pioneering director D. W. Griffiths notably first introduced the use of a pallet of shot types for the purpose of creating drama in film. This arose from a desire of the audience to explore the emotional experience of the characters of the film.

Film makers also use other techniques to tell their story, such techniques including the choice of lens and film effects. These are all used to encourage the audience to understand the intended message or purpose of the production. The audience does not need to understand how, or even be aware that, these techniques have been applied to the images. In fact, if applied properly with skill, the methods will not even be apparent to the audience.

The skill required by the successful film maker is typically only acquired through many years of tuition and practice as well as through the collaboration of many experts to achieve a successfully crafted message. Amateur film makers and home video makers in contrast often lack the skill and the opportunity to understand or employ such methods. However, amateur and home film makers, being well exposed to professional film productions have a desire for their own productions to be refined to some extent approaching that of professional productions, if not those of big-budget Hollywood extravaganzas. Whilst there currently exist many film schools that specialize in courses to educate potential film makers with such techniques, attendance at such courses is often prohibitive to the amateur film maker. Other techniques currently available that may assist the amateur film maker typically include software products to aid in the sequencing of images and/or interactive education techniques for tutoring prospective film makers. However, current software approaches have not been widely adopted due to prohibitive costs and skill required for use being excessive for small (domestic) productions.

Time is also a major factor in respect to the current techniques of film editing to unskilled editor. Typically, the time taken to plan shots and their sequencing is substantial and is typically out of the realistic scope of an average home/amateur film maker.

It is therefore desirable to provide a means by which unskilled (amateur) movie makers can create visual productions that convey a desired emotive effect to an audience without a need for extensive planning or examination of shot types.

SUMMARY OF THE INVENTION

This need is addressed through the automated classification of images and/or shots into various emotive categories thereby permitting editing to achieve a desired emotive effect.

According to a first aspect of the present disclosure, there is provided a method for automated classification of a digital image, comprising the steps of:

analyzing the image for the presence of a human face;

determining a size of the located face with respect to a size of the image; and classifying the image based on the relative size of the face with respect to the image.

According to a second aspect of the present disclosure, there is provided a method for automated classification of a digital image, comprising the steps of:

analyzing the image for the presence of a human face;

determining a position of the located face with respect to a frame of the image; and classifying the image based on the relative position of the face with respect to the image frame.

According to another aspect of the present disclosure, there is provided apparatus for implementing any one of the aforementioned methods.

According to another aspect of the present disclosure there is provided a computer program product including a computer readable medium having recorded thereon a computer program for implementing any one of the methods described above.

BRIEF DESCRIPTION OF THE DRAWINGS

One or more embodiments of the present invention will now be described with reference to the drawings, in which.

DETAILED DESCRIPTION INCLUDING BEST MODE

Figure 5:
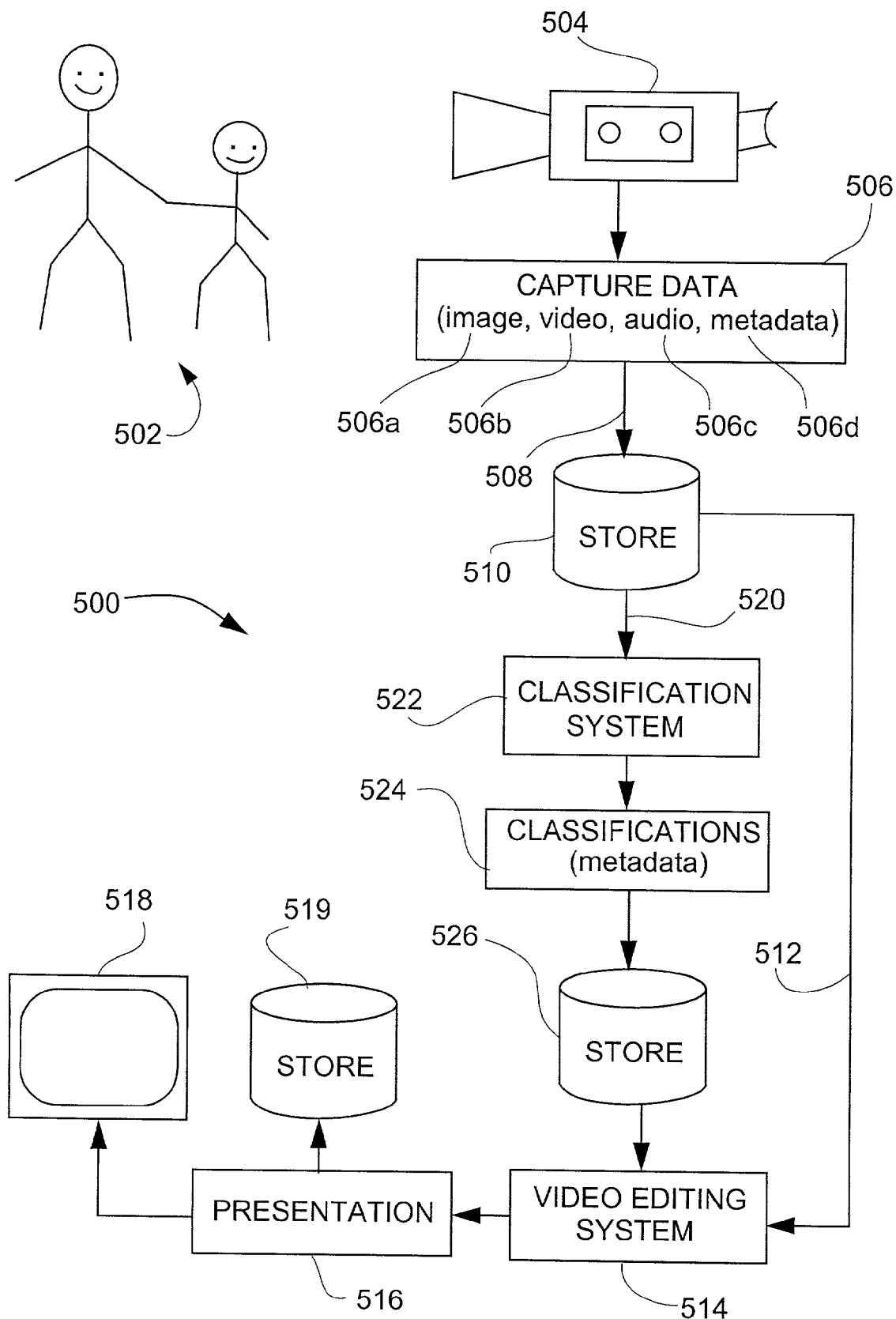
FIG. 5 is a schematic block diagram representation of an image recording and production system.

FIG. 5 shows a schematic representation of an image recording and production system 500 where a scene 502 is captured using an image recording device 504, such as a digital video camera or digital still camera. When the scene 502 is captured by a still camera, typically a sequence of still images is recorded, in effect complementing the sequence of images that might be recorded by a video camera. Associated with the capture of the images is the generation of capture data 506 which is output from the camera 504 and typically comprises image data 506a, video data 506b, audio data 506c and "camera" metadata 506d. The camera metadata 506 represents metadata usually generated automatically by the camera or manually entered by the user of the camera. Such can include image or frame number, a real-time of capture possibly include a date, details regarding camera settings (aperture, exposure, etc.) and ambient information such as light measurements, to name but a few Where appropriate, the capture data 504 recorded by the camera 504 is transferred 508 to a mass storage arrangement 510, typically associated with a computing system, whereupon the images are made available via an interconnection 520 to a visual language classification system 522. The classification system 508 generates metadata which is configured for convenient editing by the film maker. The visual language classification system 522 outputs classification data 524, configured as further metadata, which is associated with each image and which may be stored within a mass storage unit 526. The classification data 524 in the store 526 may be output to an editing module 514 which, through accessing the image data via a connection 512 to the store 510, provides for the formation of an edited sequence 528 which may be output to a presentation unit 516 for display via a display unit 518, such as a television display, or storage in a mass storage device 519. In some implementations, the stores 510, 526 and 519 may be integrally formed.

The classification system 522 performs content analysis to analyze the images residing in the store 510. The analysis performed within the classification system 522 is configured to provide information about the intention of the photographer at the time of capturing the image or image sequence. Such analysis may comprise the detection of human faces and preferably other visually distinct features including landscape features such as the sky, green grass, sandy or brown earth, or other particular shapes such as motor vehicles, buildings and the like, from the image data. Audio analysis where appropriate can be used to identify specific events within the sequence of images such a person talking, the passing of a motor car, or the crack of a ball hitting a bat in a sports game, such as baseball or cricket, for example. The classification system 522 provides metadata related to or indicative of the content identified within an image sequence, or at the particular image within the sequence.

One specific example of content analysis that may be applied by classification system 522 is that of face detection, that permits identification and tracking of particular human subjects in images or sequences thereof. An example of a face detection arrangement that may be used in the arrangement of FIG. 5 is that described in U.S. Pat. No. 5,642,431-A (Poggio et al.). Another example is that disclosed in Australian Patent Publication No. AU-A-33982/99. Such face detection arrangements typically identify within an image frame a group or area of pixels which are skin colored and thus may represent a face, thereby enabling that group or area, and thus the face, to be tagged by metadata and monitored. Such monitoring may include establishing a bounding box about the height and width of the detected face and thereafter tracking changes or movement in the box across a number of image frames.

Figure 1D:
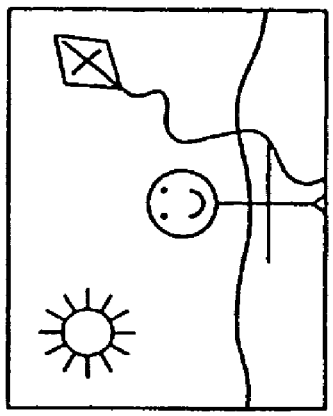
FIGS. 1A to 1G depict a number of shot ranges used by film makers.
Figure 1C:
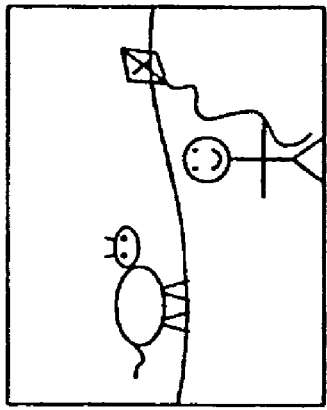
Figure 1B:
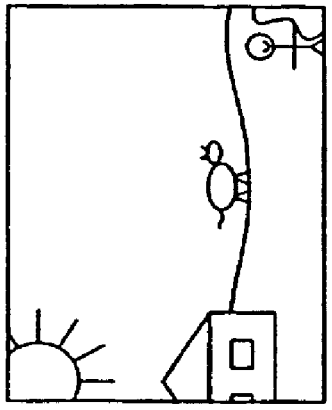
Figure 1A:
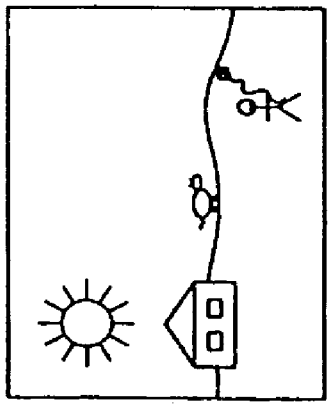
Figure 1G:
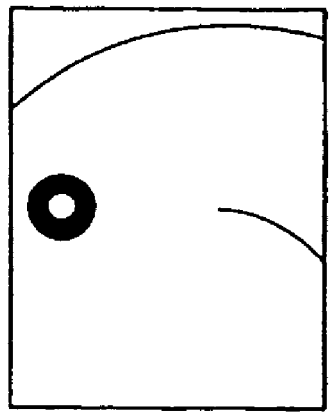

In the sequence of images of FIGS. 1A to 1G, the fine content of FIGS. 1A and 1B are generally too small to permit accurate face detection. As such, those frames may be classified as non-face images. However in each of FIGS. 1C to 1G, the face of the person flying the kite is quite discernible and a significant feature of each respective image. Thus, those images may be automatically classified as face images, such classification being identified as metadata 524 generated by content analysis performed by the classification system 522 and linked or otherwise associated with the metadata 506d provided with the images.

Further, and in a preferred implementation, the size of the detected face, as a proportion of the overall image size, is used to establish and record the type of shot. For example, simple rules may be established to identify the type of shot. A first rule can be that, where a face is detected, but the face is substantially smaller than the image in which the face is detected, that image may be classified as a far shot. A similar rule is where a face is detected which is sized substantially the same as the image. This may be classified as a close-up. An extreme close-up may be where the face occupies the entire image or where it is substantially the same size as the image but extends beyond the edges of the image.

Figure 1F:
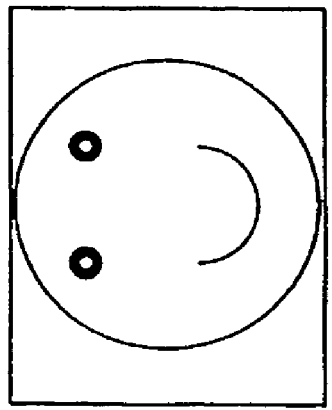
Figure 1E:
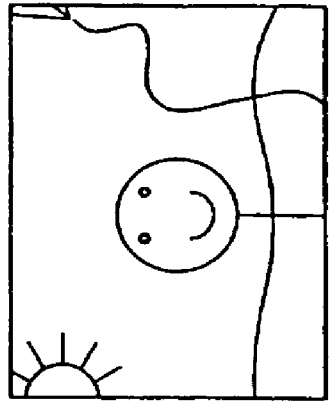
Figure 2A:
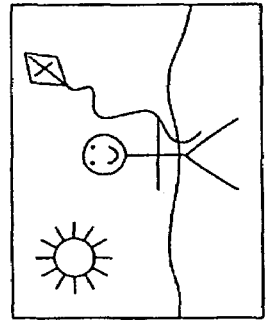
FIGS. 2A to 2C depict three different shot types used by film makers.
Figure 2B:
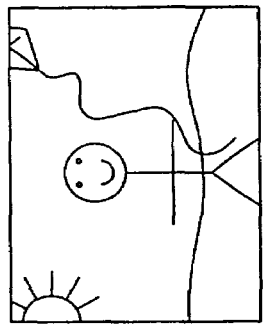
Figure 2C:
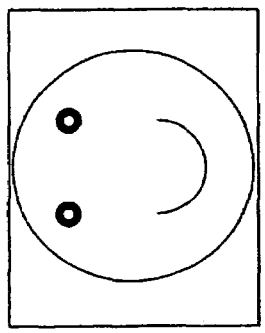
Figure 3A:
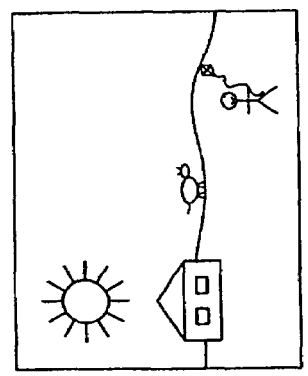
FIGS. 3A and 3B depict the effect of a pan in influencing the emotional state of the viewer.
Figure 3B:
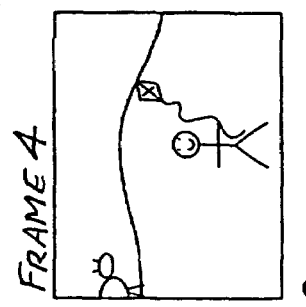
Figure 3B:
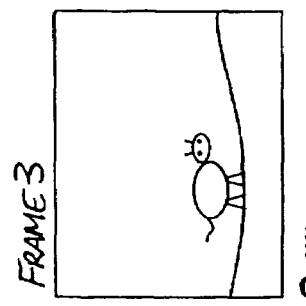
Figure 3B:
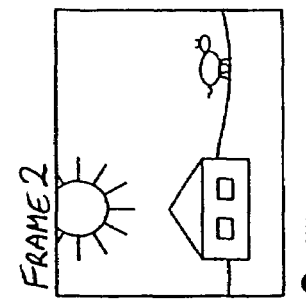

In another example, in FIG. 1C, which is a MLS, the face represents about 2% of the image. In FIG. 1D, the face occupies about 4% of the image, this being a MS. For FIG. 1E, a MCU delivers the face at a size of about 10% of the image. The CU shot of FIG. 1F provides the face at about 60% of the image, and for an ECU, the face is in excess of about 80% of the image. A suitable set of rules may thus be established to define the type of shot relative to the subject, whether or not the subject is a face or some other identifiable image structure (e.g., cow, house, motor vehicle, etc). Example rules are set out below:

| | |
|---|---|
| Medium Long Shot (MLS) | subject < 2.5% of the image; |
| Medium Shot (MS) | 2.5% < subject < 10% of the image; |
| Medium Close Up (MCU) | 10% < subject < 30% of the image; |
| Close Up (CU) | 30% < subject < 80% of the image; and |
| Extreme Close Up (ECU) | subject > 80% of the image. |

Where desired, the film maker may vary the rules depending on the particular type of source footage available, or depending on a particular editing effect desired to be achieved.

Figure 4A:
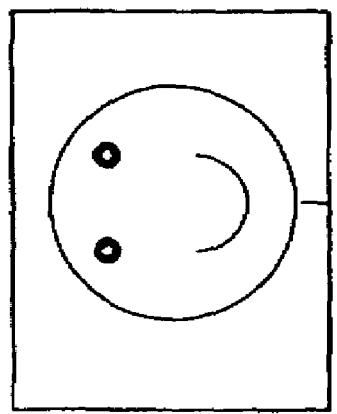
FIGS. 4A to 4E depict various angled camera shots also used by film makers.
Figure 4B:
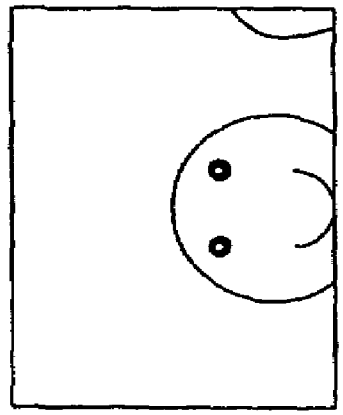
Figure 4C:
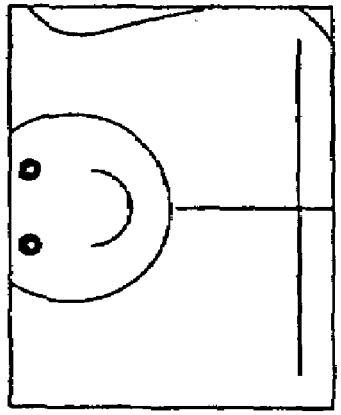
Figure 4D:
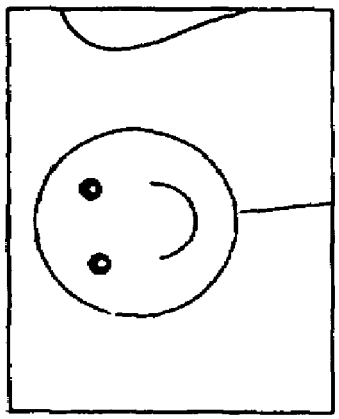

Another example of content analysis for classification is camera tilt angle. This can be assessed by examining the relative position of a detected face in the image frame. For example, as seen in FIG. 4A, where the face is detected centrally within the image frame, this may be classified as a eye-level shot. In FIG. 4B, where the subject is positioned towards the bottom of the frame, such may be classified as a high angle shot, the positioning of the detected face may be correlated with a tiling of the image frame so as to provide the desired classification. Tiles within the frame may be preclassified as eye-level, high shot, low shot, left side, and right side. The location of the detected face in certain tiles may then be used to determine an average tile location and thus classify the image according to the position of the average face tile. Such an approach may be readily applied to the images of FIGS. 4A to 4D.

Figure 4E:
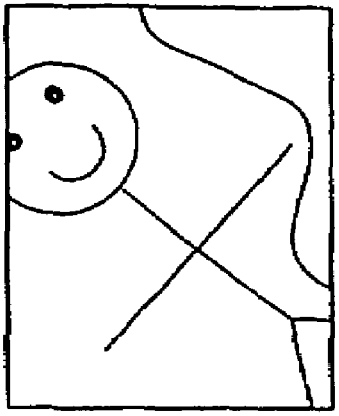

The Dutch shot of FIG. 4E may be determined by detecting edges within the image. Such edges may be detected using any one of a large number of known edge detection arrangements. Edges in images often indicate the horizon, or some other horizontal edge, or vertical edges such as those formed by building walls. An edge that is detected as being substantially non-vertical and non-horizontal may thus indicate a Dutch shot. Classification may be performed by comparing an angle of inclination of the detected edge with the image frame. Where the angle is about 0 degrees or about 90 degrees, such may be indicative of a horizontal or vertical wall, respectively. Such may be a traditional shot. However, where the angle of inclination is substantially between these values, a Dutch shot may be indicated. Preferred angles of inclination for such detection may be between 30 and 60 degrees, but may be determined by the user where desired.

In an alternative implementation, the visual language classification system can permit the user to supplement the classification with other terms relating to the emotive message conveyed by the scene. Such manually entered metadata may include terms such as "happy", "smiling", "leisure", and "fun" in the example of FIGS. 1C to 1G. More complicated descriptions may also be entered, such as "kite flying". This manually enter metadata that can supplement the automatically generated metadata and be stored with the automatically generated metadata.

As a result of such processing, the store 526 is formed to include metadata representative of the content of source images to be used to form the final production. The metadata not only includes timing and sequencing (e.g., scene number, etc.) information, but also information indicative of the content of the images and shot types which can be used as prompts in the editing process to follow.

With the database 526 formed, the user may then commence editing the selected images. This is done by invoking an editing system 514 which extracts the appropriate images or sequence of images from the store 510. Using the information contained within the metadata store 526, the user may conveniently edit particular images. The database information may be used to define fade-in and fade-out points, images where a change in zoom is desired, points of interest within individual images which can represent focal centers for zooming operations either or both as source or target, amongst many others.

Editing performed by the editing system 514 may operate using the classifications 524 in a variety of ways. For example, the user may wish to commence an image sequence with a long shot, and hence may enter into the system 514 a request for all long shots to be listed. The system 514 then interrogates the store 526 to form a pickiest of images that have been previously classified as a long shot. The user may then select a long shot from the list to commence the edited sequence. The classification thus substantially reduces the user's editing time by providing a ready source of searchable information regarding each image or shot sequence. Another example is where the user wishes to show the emotion "fear" in the faces of the subjects. Since faces are typically not detected in any significant detail for anything under a medium shot, a search of the store 526 may be made for all medium shots, close-ups and extreme close-ups. A corresponding pick list results from which the user can conveniently review a generally smaller number of images than the total number available to determine those that show "fear". User entered metadata such as "fear" may then supplement the automatically generated classification for those images that display such an emotion.

The automated content analysis of images as discussed above permits the rapid processing of sequences of images to facilitate the formation of an enhanced edited result. For example, where a video source is provided having 25 frames per second, a 5 second shot requires the editing of 125 frames. To perform manual face detection and focal point establishment on each frame is time consuming and prone to inconsistent results due to human inconsistency. Through automation by content analysis, the positions of the face since each frame may be located according to consistently applied rules. All that is then necessary is for the user to select the start and end points and the corresponding edit functions (e.g., zoom values from 0% at the start, and 60% at the end).

Metadata analysis of the source material may include the following:
 (i) time code and date data;
 (ii) G.P.S. data;
 (iii) image quality analysis (sharpness, color, content quality, etc.);
 (iv) original shot type detection;
 (v) object detection and custom object detection (determined by the author);
 (vi) movement detection;
 (vii) face detection;
 (viii) audio detection;
 (ix) collision detection;
 (x) tile (interframe structure) analysis; and
 (xi) user entered metadata.

Figure 6:
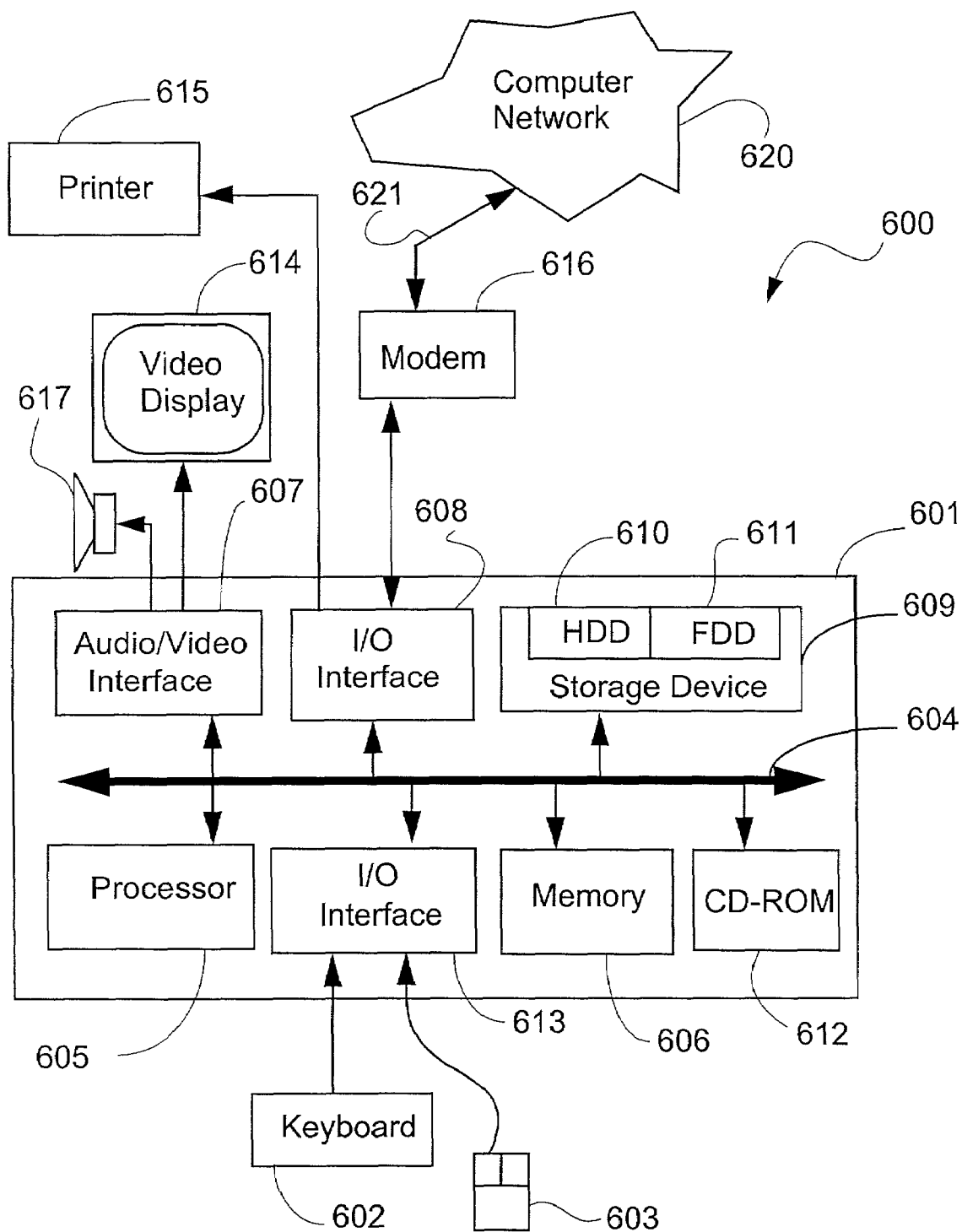
FIG. 6 is a schematic block diagram of a general purpose computer system upon which the disclosed arrangements can be practiced.

The method described above with reference to FIG. 5 is preferably practiced using a conventional general-purpose computer system 600, such as that shown in FIG. 6 wherein the processes of FIG. 5 may be implemented as software, such as an application program executing within the computer system 600. The software may be divided into two separate parts; one part for carrying out the classification and editing methods, and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for classification and consequential editing of images or sequences of images.

The computer system 600 comprises a computer module 601, input devices such as a keyboard 60 and mouse 603, output devices including a printer 615 and a visual display device 614 and loud speaker 617. A Modulator-Demodulator (Modem) transceiver device 616 is used by the computer module 601 for communicating to and from a communications network 620, for example connectable via a telephone line 621 or other functional medium. The modem 616 can be used to obtain access to the Internet, and other network systems, such as a Local Area Network (LAN) or a Wide Area Network (WAN).

The computer module 601 typically includes at least one processor unit 605, a memory unit 606, for example formed from semiconductor random access memory (RAM) and read only memory (ROM), input/output (UO) interfaces including a audio/video interface 607, and an I/O interface 613 for the keyboard 602 and mouse 603 and optionally a joystick (not illustrated), and an interface 608 for the modem 616. A storage device 609 is provided and typically includes a hard disk drive 610 and a floppy disk drive 611. A magnetic tape drive (not illustrated) may also be used. A CD-ROM drive 612 is typically provided as a non-volatile source of data. The components 605 to 613 of the computer module 601, typically communicate via an interconnected bus 604 and in a manner which results in a conventional mode of operation of the computer system 600 known to those in the relevant art. Examples of computers on which the described arrangements can be practiced, include IBM-PC's and compatibles, Sun Sparcstations or alike computer systems evolved therefrom.

Typically, the application program is resident on the hard disk drive 610 and read and controlled in its execution by the processor 605. Intermediate storage of the program and any data fetched from the network 620 may be accomplished using the semiconductor memory 606, possibly in concert with the hard disk drive 610. In some instances, the application program may be supplied to the user encoded on a CD-ROM or floppy disk and read via the corresponding drive 612 or 611. Still further, the software can also be loaded into the computer system 600 from other computer readable storage media including magnetic tape, a ROM or integrated circuit, a magneto-optical disk, or a computer readable card such as a PCMCIA card. The foregoing is merely exemplary of relevant computer readable storage media. Other computer readable storage media may also be used. The application program may alternatively be provided to computer module 601 from remotely-located computer readable storage media via radio or infra-red transmission channel, by the user from the network 620 via the modem device 616, or the Internet and Intranets including e-mail transmissions and information recorded on Websites and the like.

The method described with reference to FIG. 6 may alternatively or additionally be implemented in dedicated hardware such as one or more integrated circuits performing the functions or sub functions of the system. Such dedicated hardware may include graphic processors, digital signal processors, or one or more microprocessors and associated memories. For example, specific visual effects such as zoom and image interpolation may be performed in specific hardware devices configured for such functions. Other processing modules, for example, used for face detection or audio processing, may be performed in dedicated DSP apparatus.

Figure 7:
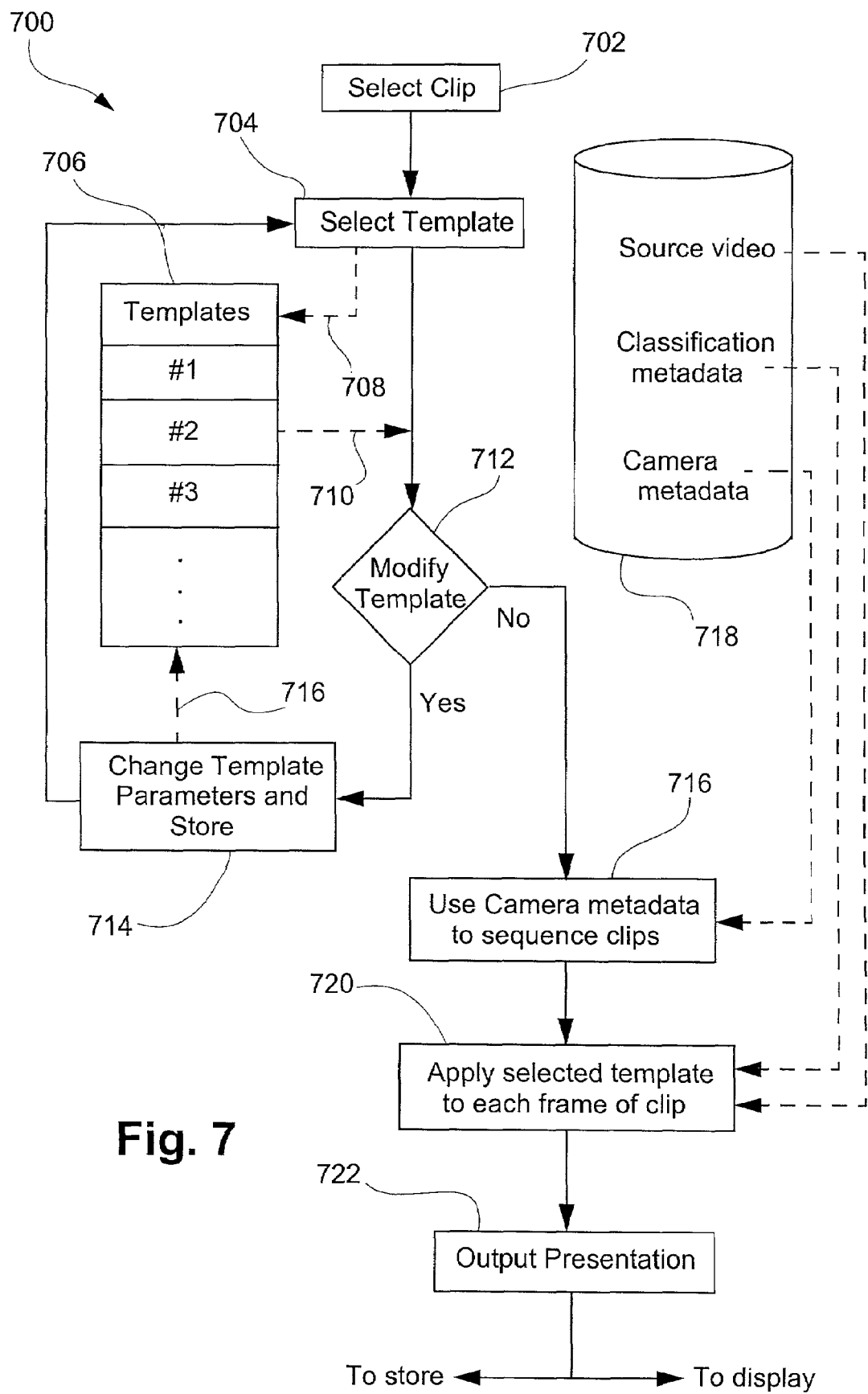
FIG. 7 is a flow chart depicting the use of templates for video editing.

The description above with respect to FIG. 5 indicates how the editing system 514 may be used to create an output presentation based upon classifications derived from the image content. A further approach to editing may be achieved using a template-based approach 700 depicted in the flow chart of FIG. 7, which for example may be implemented within the editing system 514. The method 700 commences at step 702 where a desired clip, being a portion of footage between a single start-stop transition, is selected for processing. A number of clips may be processed in sequence to create a production. This is followed by step 704 where a desired template is selected for application to the clip. A template in this regard is a set of editing rules that may be applied to various shot and clip types to achieve a desired visual effect. Alternatively, a template need only be applied to a portion of a clip, or in some instances one or still images or video extracts for which processing is desired. Typically a number of templates 706 are available for selection 708. Each template 706 may be established as a Boolean set of rules each with a number of default settings. An example template is depicted in Table 1 below and which defines particular visual effects that are top be applied to particular shot types.

TABLE 1

| Template #2 | | Effect | | | | | | | | | |
|---|---|---|---|---|---|---|---|---|---|---|---|
| | | Speed of replay | | | | | | Zoom | Color | | |
| Shot type | Select | x¼ | x½ | x1 | x2 | x4 | B&W | time | filter | Sound | etc. |
| ECU | 1 | 1 | | | | | 1 | 0 | 1 | 0 | |
| CU | 1 | 1 | | | | | 1 | 0 | 1 | 0 | |
| MCU | 1 | | | 1 | | | 1 | +2 | 1 | 0 | |
| MS | 0 | | | | | | | | | | |
| MLS | 0 | | | | | | | | | | |
| LS | 0 | | | | | | | | | | |
| Other #1 | 1 | | | | | 1 | 1 | 0 | 1 | 1 | |
| Other #2 | 0 | | | | | | | | | | |

In the template of Table 1, the various shot types are listed based upon face detection criteria described above. Two "other" shot types are shown, these for example being where no face is detected or some other detectable event may be determined. Such for example may be frames containing a white colored motor racing car of particular interest to the user, as compared to other colored racing cars that may have been captured. Such a racing car may be detected by the classification system 522 being arranged to detect both a substantial region of the color white and also substantial movement of that color thereby permitting such frames to be classified as "Other#1". The movement may be actual movement of the racing car across the frame over a series of adjacent frames, or relative movement where the racing car appears substantially stationary within the series of adjacent frames, whilst substantial movement of the background occurs. Such a classification may be formed independent of the ECU, CU, MCU etc. approach described above. As seen from Table 1, each of ECU, CU, MCU and Other#1 shot types are selected for inclusion in the edited presentation.

The template (i.e., template #2) selected 710 may altered according to a user determination made in step 712. Where alteration is desired, step 714 follows which permits the user to modify the Boolean values within the template table. As seen above, those shot types not selected (i.e., MS, MLS, LS and Other#2) are disabled from the table, as indicated by the shading thereof. Those selected shot types may then have their corresponding effects modified by the user. As shown a number of different speeds of replay are provide, the selection of one for any shot type disabling the others for the same shot type. As seen each of the ECU and CU are selected to replay at quarter speed, whereas the MCU replays at natural speed. The racing car captured by the Other#1 shot type is selected for replay at four times speed to fulfil the user's desire to accentuate the differences between facial and motor car shots. Each of the selected shots has a monochrome (B&W) setting selected, thereby removing color variation, although a color filter effect has been enabled. Such an effect may provide a constant orange/brown tinge to the entire frame and in this example would result in the images been reproduced with an aged-sepia effect. Sound is seen disabled on the facial shots but enabled on the racing car shots.

A zoom feature is also provided to permit translations between adjacent shot types. As seen in the example of Table 1, MCU shots are subject to a zoom of "+2", this notation representing a zoom-in to the next shot type (i.e., CU) with the zoom occurring over a period of 2 seconds. Typically, during the zoom, the image is automatically cropped to retain a size within that of the display. Zoom-outs are also possible and are indicated by a minus symbol (−). Durations may be specified in seconds, frames, or as being instantaneous (e.g., ++), the later directly creating a new frame for inclusion in the edited production. The transitions for zoom in Table 1 are specified as occurring between adjacent shot types. Alternatively the degree of zoom and the zoom duration may be separately specified for each shot type (e.g., MCU:150%: 25 frames; CU:200%: 10 frames; ECU:30%: 50 frames). In this fashion, the edited production may show for a particular shot type a zoom to another shot type over a predetermined period thereby enhancing the emotional effect of the production. For example, a zoom from an MCU to an ECU may form part of a "dramatic" template, being one where ECU's are used to focus the viewer's attention on the central character. A "tribute" template may include a zoom from a MCU to a CU.

Other types of image editing effects may be applied within a template as desired.

Once modified, the template is stored and control returns to step 704 where the user may select the template just modified. Once a template has been selected, step 716 follows where the sequence of clips is derived form the camera metadata retained in the store 718. Once the correct sequence is formed, the sequence is edited in step 720 by applying the selected template to the sequence. This step involves sourcing firstly the classification metadata from the store 718 to determine the shots types and then sourcing the video data to which the various effected selected for that shot may be applied. This results in the output presentation of step 722 which may be sent for storage or directly reproduced to a display arrangement.

It will be appreciated that a variety of templates may be created, each having the capacity to impose on the source image data a particular emotive editing style in response to the classification of shot types contained therein. Further, individual clips or scenes may be edited using different templates thereby altering the presentation style based upon the subject matter. Accordingly, a family visit to the motor races may include scenes depicting a picnic lunch using substantially natural footage but limited to MS's and MLS's, action scenes edited in the manner described above with respect to Table 1, and super-action scenes where substantial slow motion is used to accentuate a crash during the race. The crash may be classified by the user supplementing the metadata of that portion of footage with a tag indicating importance. Also, whilst the template of Table 1 relies predominantly on shot distance, other classifications such as tilt angle as discussed above may alternatively or additionally be included.

INDUSTRIAL APPLICABILITY

The arrangements described are applicable to the image editing and reproduction industries and find particular application with amateur movie makers who are trained in the intricacies of shot and subject identification, and consequential editing based thereupon.

The foregoing describes only some embodiments of the present invention, and modifications and/or changes can be made thereto without departing from the scope and spirit of the present invention, the described embodiments being illustrative and not restrictive.

The invention claimed is:

1. A method of processing an input sequence of digital images, said method comprising:
   using a computer to classify each digital image of the input sequence, wherein said classifying comprises:
   analyzing the digital image to detect if a human face is present;
   determining a relative size of the detected face with respect to a size of the image;
   classifying the digital image by shot type based on the relative size of the detected face with respect to the image; and
   replaying a part of the input sequence corresponding to the digital image having a shot type of close-up at a slower speed than other shot types.

2. A method according to claim 1, said method further comprising, replaying the input sequence at a faster speed if no human face is detected.

3. A method according to claim 1, said method further comprising:
   storing the classification of the digital image as metadata associated with the digital image;
   establishing an editing template for the sequence according to the metadata, the template having editing rules corresponding to the method; and
   editing the input sequence according to the template based on the metadata.

4. A method according to claim 3, wherein said editing step comprises applying at least one editing rule of the template to each image of the input sequence, wherein the images satisfying the editing rule are included in the output sequence.

5. A method according to claim 4, wherein the editing rule comprises at least one effect for application to the image, the effect being selected from the group consisting of visual effects and audible effects.

6. A method according to claim 5, wherein the visual effects are selected from the group consisting of reproduction speed variation, zooming, blurring, and color variation.

7. A method according to claim 1, wherein said other shot types include at least a medium shot type, a medium long shot type, and a long shot type.

8. An apparatus for processing an input sequence of digital images, said apparatus comprising:
   means for classifying each digital image of the input sequence, wherein said means for classifying comprises:
   means for analyzing the digital image to detect if a human face is present;
   means for determining a relative size of the detected face with respect to a size of the image; and means for classifying the digital image by shot type based on the relative size of the detected face with respect to the image; and means for replaying a part of the input sequence corresponding to the digital image having a shot type of close-up at a slower speed than other shot types.

9. A computer-readable storage medium storing a computer-executable program, the computer-executable program being executable by a computer apparatus so as to control the computer apparatus to process an input sequence of digital images, said program comprising:

code for classifying each digital image of the sequence, wherein said code for classifying comprises:

code for analyzing the digital image to detect if a human face is present;

code for determining a relative size of the detected face with respect to a size of the image;

code for classifying the digital image by shot type based on the relative size of the face with respect to the image; and code for replaying a part of the input sequence corresponding to the digital image having a shot type of close-up at a slower speed than other shot types.

* * * * *